United States Patent [19]

Kollross

[11] Patent Number: 5,203,142
[45] Date of Patent: Apr. 20, 1993

[54] METHOD AND APPARATUS FOR THE MECHANICAL PACKING OF A TUBULAR SEGMENT SHIRRED ONTO A SHIRRING TUBE

[76] Inventor: Günter Kollross, Am Wallerstädter Weg 20, D-6080 Gross Gerau-Dornheim, Fed. Rep. of Germany

[21] Appl. No.: 864,230

[22] Filed: Apr. 6, 1992

[30] Foreign Application Priority Data

Apr. 10, 1991 [DE] Fed. Rep. of Germany ....... 4111623

[51] Int. Cl.⁵ .................................................. B65B 9/18
[52] U.S. Cl. ....................................... 53/436; 53/435; 53/529; 53/576; 53/581
[58] Field of Search ................. 53/576, 581, 577, 563, 53/429, 436, 435, 529, 522; 493/308, 302, 288

[56] References Cited

U.S. PATENT DOCUMENTS

| | | |
|---|---|---|
| 3,184,786 | 5/1965 | Ives .................................... 53/581 X |
| 3,745,611 | 7/1973 | Patouillard ....................... 53/581 X |
| 4,495,751 | 1/1985 | Galbiati ............................ 53/581 X |
| 4,625,362 | 12/1986 | Kollross et al. ................... 53/576 X |
| 4,993,210 | 2/1991 | Kollross ........................... 53/429 X |

FOREIGN PATENT DOCUMENTS

3138685A1 4/1983 Fed. Rep. of Germany.

*Primary Examiner*—James F. Coan
*Attorney, Agent, or Firm*—Larson and Taylor

[57] ABSTRACT

A tubular shirred formation (34) is covered by a previously shirred tubular net (38), which is held ready on a supply drum (36), with one end (42) closed and, with axial insertion, the tubular shirred formation (34) is covered, and then the other end is closed off. To simplify the device and to avoid an axial expansion of the tubular shirred formation (34) before packing, its axial insertion into the closed tubular net (38) and the covering of the tubular shirred formation take place while the tubular shirred formation is still seated on the shirring tube (16). Before covering the tubular shirred formation (34) is compressed further by pushing its front end against a stop (64) which is fixed in the axial direction.

22 Claims, 3 Drawing Sheets

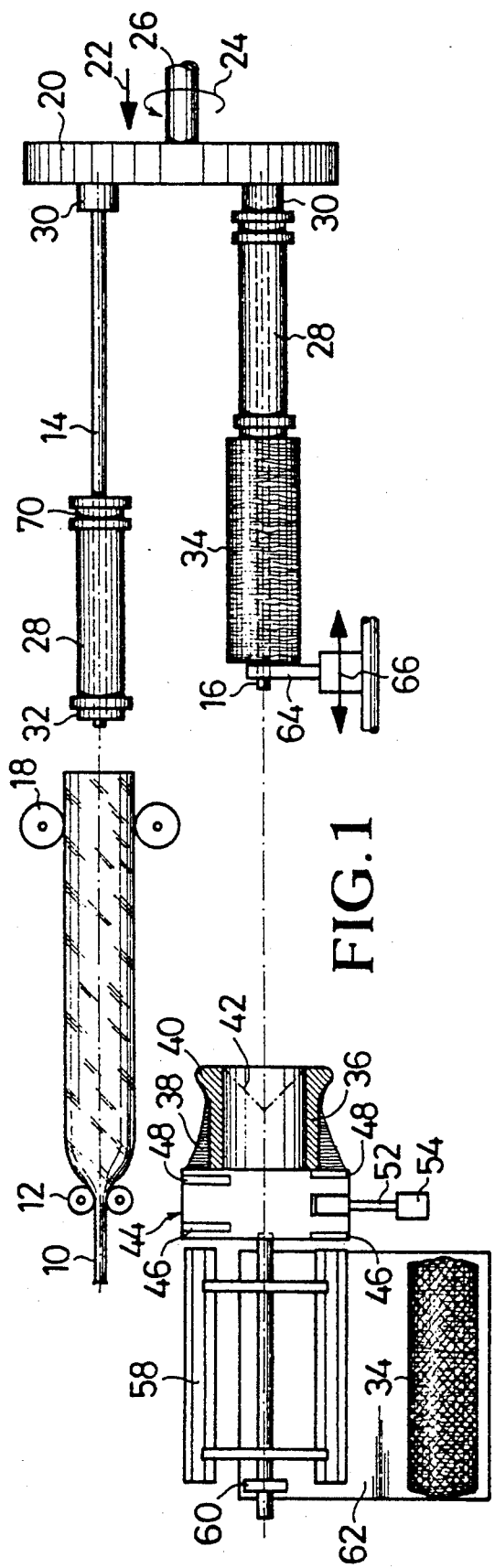
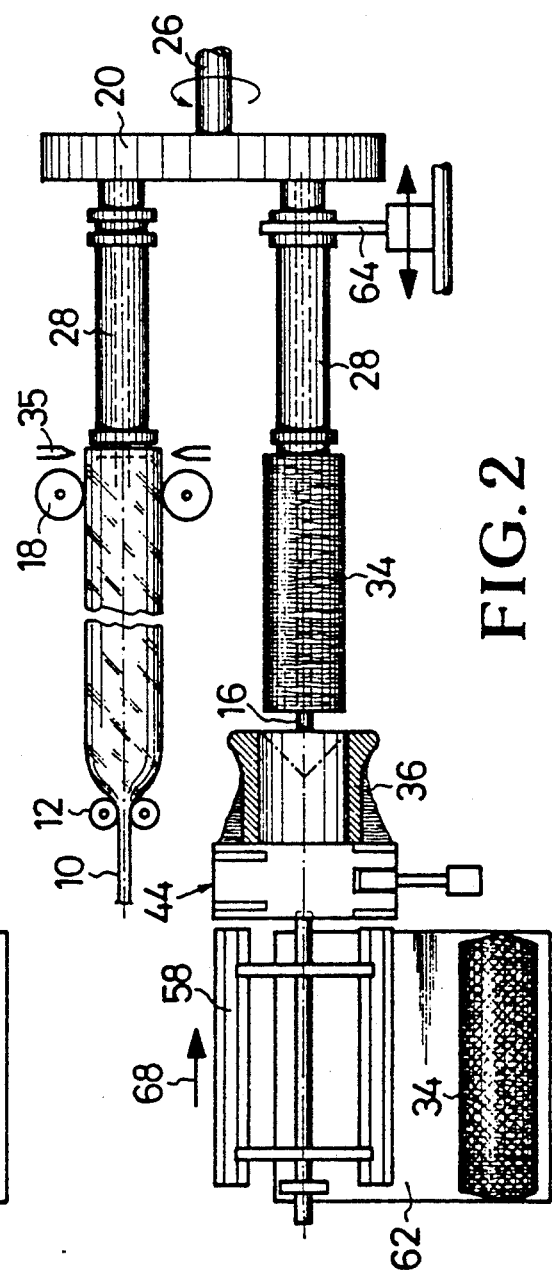

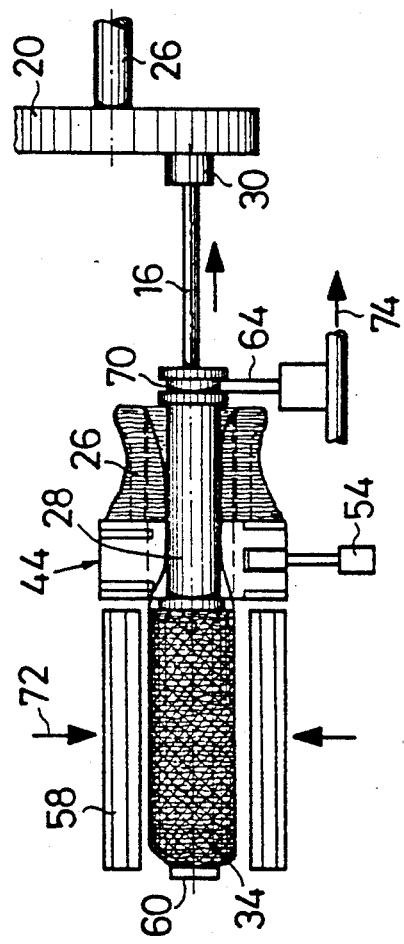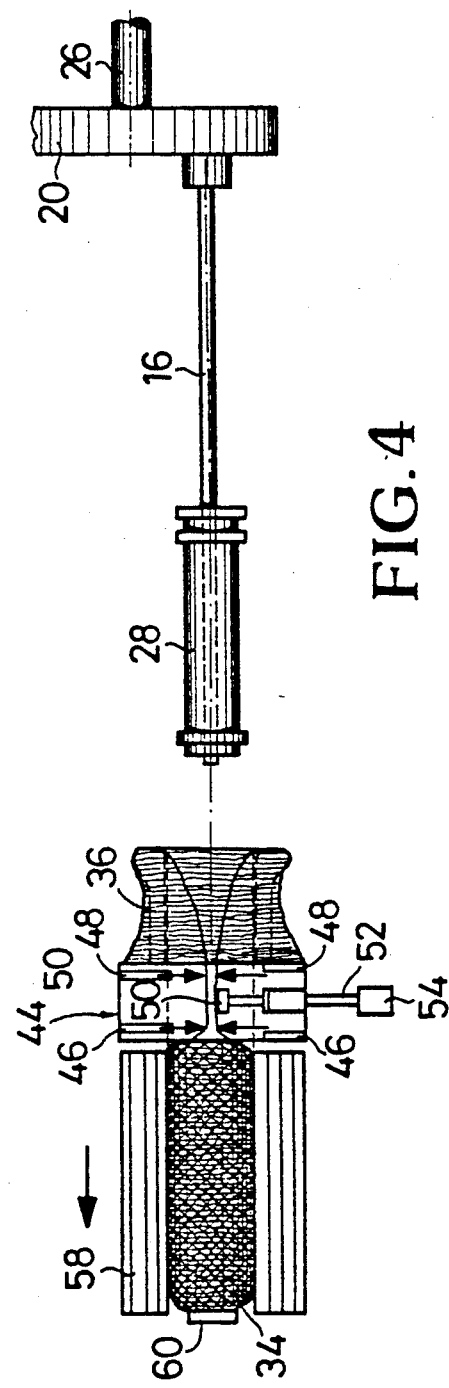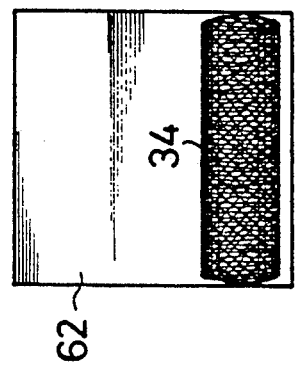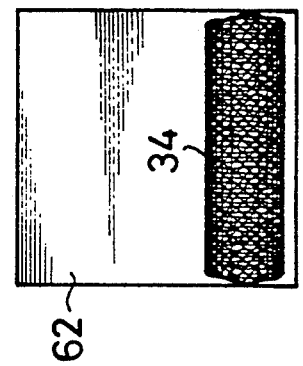

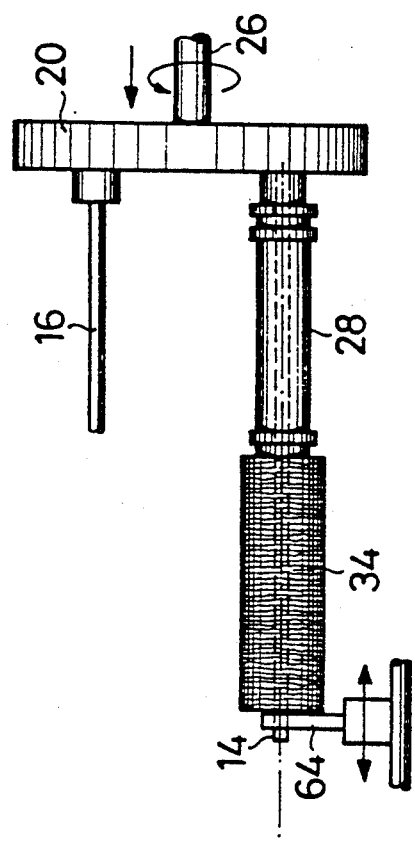
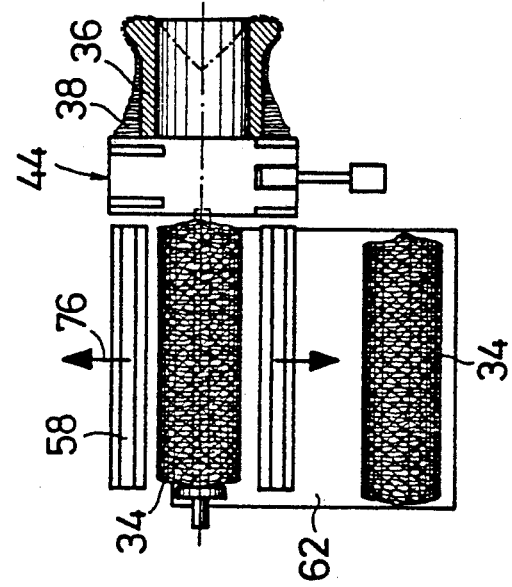
FIG.5

METHOD AND APPARATUS FOR THE MECHANICAL PACKING OF A TUBULAR SEGMENT SHIRRED ONTO A SHIRRING TUBE

The invention relates to a method of mechanical packing of a tubular casing segment, which has been shirred, on a shirring tube, to a tubular shirred formation e.g. artificial skin for sausage manufacture, into tubular shaped covering material, a supply of which is maintained in shirred condition with one end closed and is placed on to the tubular shirred formation by axial insertion of the tubular shirred formation and is closed off at its rear end.

In order to pack tubular shirred formations it is known from German laid-open patent application 31 38 685, that a radial, elastic, tubular-shaped covering material can be shirred in short segments, whose lengths are just sufficient for one single tubular shirred formation only. While the tubular shirred formation remains seated on the shirring tube the covering material segment, which is open at both ends, is brought over the tubular shirred formation in a radially expanded condition and is then radially shrunk. The covered tubular shirred formation is then removed from the shirring tube. It has been found, however, that an undesired expansion of the axially compressed tubular shirred formation cannot be prevented reliably by means of radial elasticity of the covering material only. Aside from this expensive covering material must be used.

From U.S. Pat. No. 4,993,210 is known a method as mentioned at the beginning. According to this the tubular shirred formation is removed from the shirring tube by means of a prism gripper and is transported laterally to a position where it is released and, by means of a stamp, is axially thrust against the closed end of a tubular net-shaped, shirred covering material. In this way the covering material is placed over the tubular shirred formation and is subsequently crimped radially at its rear end, closed off by means of two clamps which are displaced axially from one another and, between them, it is cut off.

This known method requires correspondingly extensive and complicated mechanical and control elements for guiding and transporting the tubular shirred formation at several levels and in different directions. This gives rise to the possibility that the tubular shirred formation, which has been firmly shirred on the shirring tube, can expand out again due to material elasticity, during the transport operations, before it is packed into the covering material.

The object of this invention is to provide a method and suitable apparatus for its implementation, which ensure a fully automatic guiding and axial enclosure of tubular shirred formations, in a firmly shirred condition, in the covering material, with the smallest possible outlay.

In accordance with the invention this objective can be achieved by a method in which the axial insertion of the tubular shirred formation into the covering material and the placing on of the covering material take place while the tubular shirred formation remains seated on the shirring tube, whereby the tubular shirred formation is thrust with its front end against the closed end of the covering material and then is gripped about its periphery and held, after which the shirring tube is withdrawn from the rear end of the tubular shirred formation and from the region between it and the covering material supply and, in this region, the covering material is radially crimped, sealed off and cut through.

For the implementation of this method only one axial drive for the relative movements between the supply of shirred covering material and the tubular shirred formation is required. A particular advantage is that the firmly shirred condition of the tubular shirred formation is preserved until it has been covered by the covering material. In a preferred embodiment of the invention the length of the packed tubular shirred formation can be shortened still further, by compressing the tubular shirred formation axially on the shirring tube which can be achieved by a temporary braking action of a stop or retention of its forward end relative to its rear end, before it is placed in the covering material. In a further preferred embodiment of the invention the covering material is closed off at the rear end of the tubular shirred formation while this is still substantially aligned with the withdrawn shirring tube.

The covering material can be closed off, using conventional methods, at both ends by means of clamps. However a covering material of thermoplastic material is preferentially used, which is radially crimped at the end of an enclosed segment of a tubular shirred formation and is closed off by heat sealing. Surprisingly, in spite of the force used in pressing together the tubular shirred formation, a tubular net can be used as covering material and can be sealed off at its ends.

An apparatus which is suitable for executing this new method comprises a shirring tool generating shirred formations of the casing on at least one shirring tube which is laterally movable between several positions and has a pull-off collar slidably mounted on it, a hollow storage drum carrying on its outer peripheral surface a supply of axially shirred tubular covering material, a close-off and cutting device for the covering material and a gripper device for holding the enclosed tubular shirred formations about the periphery during sealing of the covering material, wherein the storage drum, the close-off and cutting device and the gripper device are arranged as a unit in a shirring tube position in allignment with the shirring tube and this unit and the shirring tube are movable relative to one another in such a way that the shirring tube is feedable through the storage drum into the gripper device and is again withdrawable from the storage drum.

An example of the invention will now be described in greater detail with reference to the attached drawings. They show:

FIG. 1 a shirring and packing apparatus in a position before the beginning of a shirring and packing cycle, seen from above in simplified plan view;

FIG. 2 the apparatus as in FIG. 1 after the shirring tube has been inserted into the tubular-shaped material to be shirred, while simultaneously a tubular shirred formation, which has been previously shirred and which is seated on another shirring tube, is brought up to a supply drum, which holds covering material for packing the tubular shirred formation;

FIG. 3 a partial view of the apparatus as in FIG. 1 and 2 in a position where the tubular shirred formation, seated on the shirring tube, has been driven completely through the supply drum with covering material and is thereby covered;

FIG. 4 in a partial view as in FIG. 3 the apparatus in a position after the withdrawal of the shirring tube from the tubular shirred formation during the sealing off of the covering material;

FIG. 5 the components as shown in FIG. 3 and 4 again returned to the initial position as in FIG. 1, in which the previously packed tubular shirred formation is released and ejected.

In FIG. 1 and 2 a conventional shirring device for the manufacture of shirred tubular casing segments from any given length of tubular casing is schematically represented. The tubular casing 10, in a flattened condition, comes from an unwinding reel (not shown) and passes first through a roller pair 12, which compresses it flatly. After the rollers 12 the tubular casing 10 is opened by means of a shirring tube 14, which is provided with a bore, through which inflation air is blown into the tubular casing 10. The tubular casing finally passes through a shirring tool 18, which is represented schematically by two shirring rollers, which constrict the tubular casing on the shirring tube periphery and, at the same time, move it forward by means of their rotation.

In place of the two shirring rollers indicated the shirring tool 18 can have three or more rollers or it can employ different types of shirring elements as e.g. a rotary-driven inner worm as is known already from German Patent 21 47 498. The type of shirring tool which will be employed is of no concern with regard to the method being discussed here since all shirring tools have in common the feed of the tubular casing during shirring. FIG. 2 shows the situation after the insertion of the shirring tube 14 into the inflated end section of the tubular casing 10. The rollers 12 and the shirring tool 18 are now stationary and the tubular casing 10 extends some distance over the shirring tool 18, where it is held open by inflation air with approximately the same spacing from the shirring tube 14 around its periphery. The shirring tube 14 is mounted securely with its rear end on a revolver disk 20, which, as shown by arrows 22 and 24, is axially movable and can be rotated in prespecified angular steps. In the exmple case the revolver disk 20 is mounted with another shirring tube 16 and this tube is placed on the same radius as shirring tube 14 with reference to the rotational axis 26 of revolver disk 20 but is offset 180° to shirring tube 14. Instead of the revolver device 20, as described, with two shirring tubes 14, 16 another mount for one, two or more shirring tubes can be provided, which is rotatable and can be displaced in such a way that a shirring tube can be moved from a position aligned with the incoming tubular casing 10 and the shirring tool 18, into another position displaced laterally with reference to the first position. This occurs in the device as in FIG. 1 and 2 simply by rotating the revolver disk by 180°, whereby shirring tube 14 and shirring tube 16 can be alternately brought into a shirring position (in FIG. 1 and 2 shown above) and into a packing position (in FIG. 1 and 2 shown below).

An axially displacable pull-off collar 28 is seated on each shirring tube 14, 16, which is axially supported at its endmost position by the revolver disk 20 or by means of an abutment collar 30 attached to the disk. In the example the pull-off collar 28 has a forward tapering end 32, which penetrates into the tubular cover length and centers its end. The free end of the tubular casing 10 can also abut directly against the end face of the pull-off collar 28. The shirring procedure i.e. the formation of a tubular shirred formation from the tubular casing 10, is not shown in the diagram as this procedure is already known and is not an important feature of the invention. During the shirring procedure the shirring tool 18 forms the tubular casing 10 into folds and presses them against the pull-off collar 28, while the revolver disk 20, starting from its position as in FIG. 2, returns slowly to the right. A tubular shirred formation 34 of any desired length is thus formed on shirring tube 14, as is shown for the other shirring tube 16. The tubular shirred formation formed out of the multiple-folded tubular casing 10 is cut off by a cutting device 35 between the pull-off collar 28 and the shirring tool 18 from the part of the tubular casing 10 which has not yet been shirred.

The invention is concerned with the packing of the tubular shirred formation 34, which has been formed on a shirring tube as described above. For this the revolver disk 20, as indicated by arrow 24, is rotated 180°, so that the shirring tube with its previously formed tubular shirred formation 34 reaches a position where it is located parallel to, and laterally displaced from, the end of the tubular casing material 10 and shirring tool 18, as is shown in FIG. 1 for shirring tube 16. In this position shirring tube 16 is located displaced axially from a supply drum 36, which holds a supply of axially shirred covering material 38 on its outer periphery. The end of the covering material 38, which is facing revolver disk 20, is pulled over a radially enlarged and rounded extraction end 40 of the supply drum 36 and is closed as shown in FIG. 1 with dotted line 42. The covering material 38 is preferably a tubular net composed of thermoplastic, which can be sealed off by means of heat.

The supply drum 36 is fixed in an easily detatchable manner on an end wall of the casing of a close-off and cutting device 44. This device contains two pairs of crimping elements 46, 48 and, between them is located an electrically heated heat-seal weld head 50 (see FIG. 4) which is connected with a weight 54 by a lever arm 52, mounted on bearings and capable of being pivoted.

The crimping elements 46, 48 are arranged substantially concentrically with regard to the axial central bore of supply drum 36 and e.g. similar to displacement tools as they are used for crimping a length of sausage for separating the individual sausages. They are so designed that they tie up a tubular-shaped type material, which extends through the central bore of supply drum 36 and through the close-off and cutting device 44, radially on the center axis of the supply drum 36 and the shirring tube 16. The heat-seal weld head 50 can be brought between the crimping elements 46, 48 up against the thread-shaped crimped tubular cover in order to seal this off and cut through it.

On the opposite side of the supply drum 36 the close-off and cutting device 44 is connected to a gripper 58 e.g. in the form of a prism forceps. The gripper 58 is so dimensioned that it can grip a tubular shirred formation 34, which has been inserted through the central bore of the supply drum 36 and through the close-off and cutting device 44, substantially over its entire length, on its periphery and can hold it under radial tension. An axially adjustable abutment 60 is located at the axial outer end of the gripper 58 and projects into the path of movement of a tubular shirred formation 34, which has been moved axially through the supply drum. In the initial position as in FIG. 1, a laterally-descending ramp or slide 62 is mounted under gripper 58, where finished packed tubular shirred formations 34 can be ejected.

During the shirring procedure the shirred tubular casing material is pressed radially and firmly against the shirring tube so that a tubular shirred formation 34 largely retains its shape and length, as long as it is seated on the shirring tube. In the device shown a further compression of the compressed tubular shirred formation, over and above the condition attained by shirring, is provided for as well. For this purpose a stop 64 can be pivoted or slid between the revolver disk 20 and supply drum 36 radially in the axial movement path of the tubular shirred formation 34, as shown in FIG. 1. In this way it comes into position at the front end of tubular shirred formation 34, when this, together with revolver disk 20 and shirring tube 14, 16, with reference to FIG. 1 and 2, is moved to the left in order to insert a shirring tube 14 into the inflated tubular cover length 10 and simultaneously to bring the tubular shirred formation 34, which is seated on the other shirring tube 16, to the supply drum 36 with the covering material 38. With this movement, which effects a transfer from the position as in FIG. 1 to the position as in FIG. 2, due to the temporary location of stop 64 at the front end of the tubular shirred formation 34, this is axially compressed between the stop 64 and the pull-off collar 28, which is held between the abutment collar 30 and revolver disk 20. This compression procedure can be executed so that e.g. stop 64 retains its axial position while the revolver disk 20 moves to a position in a certain distance from the stop, then halts in this position and, after a radial withdrawal of stop 64, continues further to the left into the position as in FIG. 2. Practical trials have indicated however that the intermediate retention of the revolver disk 20 to effect a withdrawal of stop 64 is not really necessary. The latter can also be withdrawn radially, during the continuous axial displacement of the revolver disk 20 to the left, when the disk has approached the stop to certain distance. The stop 64 can also be moved during the compression of the tubular shirred formation 34, in the direction of the double arrow 66, in one or the other direction, whereby the only consideration here is that, due to the relative speed difference between stop 64 and revolver disk 20, their distance shortens to a certain gap, with which the compressed concertina tube 34 is shortened from its original dimension to a centain dimension.

The revolver disk 20 executes those axial movements which are required for shirring a specific length of the tubular casing 10, e.g. 70 meters, to a tubular shirred formation. These axial movements of shirring tube 14, 16 are normally not sufficient to transport the tubular shirred formation 34 through the supply drum 36 and the close-off and cutting device 44, through to the gripper 58, in the sideways position, which the shirring tube 16 adopts in FIG. 1 and 2. For this reason the unit, consisting of the supply drum 36, the close-off and cutting device 44 and gripper 58 should, in general, be axially movable. The drive can be e.g. by means of a controlled electric motor via a threaded spindle or a controllable hydraulic drive. The drive elements are of the conventional type and have been omitted from the drawing to improve clarity. By means of this drive the unit, consisting of components 36, 44 and 58, independently of how far the free end of the shirring tube 16 and the front end of the tubular shirred formation 34 project into the supply drum 36 in the left end position of the revolver disk 20, moves to the right as indicated by arrow 68 until the free end of the shirring tube 16 is located near abutment 60. This movement can be implemented very quickly, whereby the free end of the shirring tube 16 moves against the closed end 42 of the covering material 38 and, in this way, a section of the total length of e.g. 40 meters of the supply of covering material 38 is pulled in radially over the rounded extraction end 40 and, by means of this drawing-through operation in the left-hand direction, it is turned inside out and pulled at least over the front portion of the tubular shirred formation 34. If the tubular shirred formation 34 is seated on the front end of the shirring tube it can be held by means of a controllable stop (not shown) mounted on gripper 58 or on device 44 while the shirring tube is withdrawn.

The extent to which the free end of the shirring tube 16 projects out from the tubular shirred formation 34 is dependent on the lengths of the individual tubular shirred formations to be packed. Generally the front end of the tubular shirred formation 34 is located at a more or less large distance from the front end of the shirring tube 16. This is of no consequence however since the covering material 38 can be drawn off the supply with only minimum resistance and, in this way the closed end 42 is not broken through by the inwardly-thrusting shirring tube 16.

The axial and radial drives of stop 64 are controlled so that, when the revolver disk 20 has been slid fully into the left-hand position, stop 64, which has been first radially withdrawn after the compression of tubular shirred formation 34 according to FIG. 1, is again moved radially inwards and, in this way, as indicated by FIG. 2, meshes into a corresponding groove 70 in the pull-off collar 28. The stop 64 then holds the pull-off collar 28 in an axially fixed position, while the revolver disk 20, with the shirring tubes 14 and 16, is withdrawn slowly to the right into the initial position, during the continuous shirring procedure. Here the unit, consisting of components 36, 44 and 58 follows with the same speed whereby the distance to the revolver disk 20, which has resulted as the unit was moved with abutment 60 to a position near the free end of the shirring tube 16, is retained. The axial movement of the supply drum 36 is first arrested when it is driven near to stop 64 as indicated in FIG. 3. During this movement the tubular shirred formation 34 is held fast by means of the pull-off collar 28, which is held in a fixed position by stop 64, so that it is stripped from the shirring mandrel or tube 16, which is withdrawn to the right. In the position as indicated in FIG. 3 the free end of the shirring tube 16 has been withdrawn to such an extent that it does not any more project over the front end of the tubular shirred formation 34, and abutment 60, which is connected with gripper 58 and which has been following the withdrawl movement up to this point, has reached the front end of the tubular shirred formation 34, which is now completely enveloped by covering material 38. Now gripper 58 closes as indicated in FIG. 3 with arrow 72, closes and tensions the tubular shirred formation over its entire length, radially at its periphery. As can be further seen in FIG. 3 the pull-off collar 28 is so long that it extends axially through supply drum 36 through to the close-off and cutting device 44, while, at its rear end, it is fixed in an axial position by means of stop 64 which is held in groove 70. The preferred shape of stop 64 is that of a forceps, whose lever arms grip into groove 70 on opposite sides.

Abutment 60 is not necessary if gripper 58 grips the tubular shirred formation 34 radially and tensions it as soon as the free end of shirring tube 16, which originally projects over the front end of the tubular shirred formation 34, has been withdrawn up to the front face of the tubular shirred formation 34. However abutment 60 provides an additional security in so far as the tubular shirred formation 34, with reference to FIG. 3, cannot expand to the left while the shirring tube 16 is being withdrawn. With the presence of abutment 60 one can wait with the activation of gripper 58 until the shirring tube 16 has been almost completely withdrawn from the tubular shirred formation 34.

Shortly before during the withdrawal movement of shirring tube 16 its front end reaches the front end of pull-off collar 28, stop 64 and thus the pull-off collar 28 are also withdrawn from the supply drum 36 with the same speed, as is indicated in FIG. 3 by arrow 74. In this way the position as in FIG. 4 is reached.

After the pull-off collar 28 has been withdrawn from the close-off and cutting device 44, the function of the crimping elements 46, 48 is activated and, between them, crimp the covering material to a small narrow string along the center longitudinal axis. Then a power cylinder (not shown) which had supported lever arm 52 and had held weight 54 at a raised level, while simultaneously the heat-seal weld head 50, which is connected with lever arm 52, had assumed a radially withdrawn position, releases lever arm 52, so that the heat-seal weld head 50 is pivoted against the radially crimped covering material between the crimping elements 46, 48, whereby the contact pressure is determined by the size of weight 54 and the length of lever arm 52. Heat-seal weld head 50 welds through the covering material 38, which is crimped radially, whereby, on both sides of heat-seal weld head 50, a heat-seal weld is made. As indicated in FIG. 4, the result is that, on the left-hand side of the heat-seal weld head 50, a seal of the covering material at the rear end of the covered tubular shirred formation 34 is made and also on the right-hand side of the heat-seal weld head 50 a seal is made at the end of the covering material supply and, in this way, the initial position, as indicated in FIG. 1 and 2 is established again. After the heat-seal weld head 50 has welded through the covering material length and has cut this off between the two above-mentioned seals, weight 54 is again raised by the above-mentioned power cylinder and the heat-seal weld head 50 is pivoted back radially in an outer direction.

While the above-described welding procedure is taking place the unit, consisting of the supply drum 36, the close-off and cutting device 44 and the gripper 54, can be moved to the left into its initial position as indicated in FIG. 1 and 2, as this movement does not interfere with the welding procedure. In the left-hand final position, after the welding procedure has been completed, gripper 58 opens in the direction of arrow 76 as indicated in FIG. 5 and allows the finally packed tubular shirred formation 34 to fall onto the ramped surface 62 so that it can be ejected laterally from the machine without any further transport drive being necessary to convey it. Naturally the packed tubular shirred formation could be transferred by gripper 58 to a suitable conveyor device and could be further transported to another place.

In the position as indicated in FIG. 4, the revolver disk 20 has already reached its initial (starting) withdrawn position. The pull-off collar 28 is seated on the front end of the shirring tube 16 and a new tubular shirred formation 34, which has been formed during the above-described packing cycle, is seated on the shirring tube 14 which is not indicated in FIG. 4 and 5. At this point stop 64 is radially withdrawn and is driven to the position required for the compression of the next tubular shirred formation 34. Then revolver disk 20 is rotated 180°. The pull-off collar 28, which is seated on the front end of the shirring tube 16, which is now in the shirring position, is gripped by a conventional pipe-centering device (not shown) and is held in position axially and radially while the shirring tube is fed to the left through the shirring tool 18, to prepare for the next shirring operation, as described above. Before the shirring operation is initiated the pipe-centering device releases the pull-off collar 28 and the entire shirring procedure, as previously described, and the packing operation, which is executed in parallel with this, can begin again.

What is claimed is:

1. A method of mechanically packing a tubular casing segment comprising the step of:
   shirring the tubular casing segment on a shirring tube to form a tubular shirred formation;
   providing a supply of tubular shaped covering material in a shirred condition with one end closed;
   axially thrusting a front end of the shirred formation against the closed end of the covering material and introducing the remainder of the shirred formation into the covering material while the shirred formation is seated on the shirring tube to form a covered formation;
   gripping the covered formation about a periphery thereof;
   withdrawing the shirring tube from a rear end of the shirred formation as the covered formation is gripped and from a region between the covered formation and the supply of the covering material;
   radially crimping a trailing portion of the covering material in the region;
   sealing off of the trailing protion of the covering material in the region; and
   cutting through the trailing portion of the covering material in the region to form a rear end for the covered formation and a new closed end for the supply of the tubular shaped covering material.

2. A method of packing as claimed in claim 1 wherein said axially thrusting step includes the step of axially compressing the tubular shirred formation on the shirring tube by braking the front end of the shirred formation relative to the rear end prior to engagement of the front end with closed end of the covering material.

3. A method of packing as claimed in claim 1 wherein said sealing off step occurs while the shirred formation is in alignment with the withdrawn shirring tube.

4. A method of packing as claimed in claim 3 wherein the covering material is a thermoplastic material; wherein said crimping step includes the closing of the trailing portion of the covering material at two axially separated points; wherein said sealing and said cutting steps includes the heating of the trailing portion between the two points to cut therethrough and to heat-seal both sides of the cut-through.

5. A method of packing as claimed in claim 1 wherein said providing step provides the covering material as a tubular net.

6. A method of packing as claimed in claim 5 wherein said axially thrusting step includes the inserting of the shirred formation on the shirring tube through the tubular net until the front end of the shirred formation engages an axial abutment.

7. A method of packing as claimed in claim 5 wherein said axially thrusting step includes the feeding of the shirred formation on the shirring tube through the supply of shirred tubular net until the rear end of the shirred formation is past the supply of the covering material by a predetermined distance prior to withdrawal of the shirring tube.

8. A method of packing as claimed in claim 7 wherein said withdrawing step includes the holding of the shirred formation in position as the shirring tube is withdrawn by a radial collar movably mounted on the shirring tube.

9. A method of packing as claimed in claim 7 wherein said withdrawing step includes the holding of the shirred formation in position as the shirring tube is withdrawn by a support having a length equal to the predetermined distance and located on an opposite side of the supply from the shirred formation.

10. A method of packing as claimed in claim 7 wherein said crimping, sealing off and cutting steps are performed within the predetermined distance between the supply and the rear end of the shirred formation; and wherein (a) said crimping step includes the crimping of the trailing portion at two axially separated points, (b) said sealing off step includes the sealing off of the trailing portion at the two points, and (c) said cutting step cuts the trailing portion between the two points.

11. A method of packing as claimed in claim 10 and further including the steps of releasing the covered formation from gripping after the cutting step and the ejecting of the covered formation by gravity down a slant plane.

12. Apparatus for shirring and packing tubular casing comprising a shirring tool generating tubular shirred formations of the casing on at least one shirring tube which shirring tube is laterally movable between several positions and has a pull-off collar slidably mounted thereon, a hollow storage drum carrying on an outer peripheral surface thereof, a supply of axially shirred tubular covering material, a close-off and cutting device for the covering material and a gripper device for holding the enclosed tubular shirred formations about the periphery during sealing of the covering material, wherein the storage drum, the close-off and cutting device and the gripper device are arranged as a unit in a shirring tube position in alignment with the shirring tube and this unit and the shirring tube are movable relative to one another in such a way that the shirring tube is feedable through the storage drum into the gripper device and is again withdrawable from the storage drum.

13. Apparatus in accordance with claim 12, wherein a stop is positioned alongside the shirring tube and is movable into the path of the tubular shirred formation before insertion thereof into the storage drum by the shirring tube in order to compress the tubular shirred formation with the front end thereof abutted against the stop.

14. Apparatus in accordance with claim 13, wherein the stop is movable along the shirring tube and is engageable with the pull-off collar abutting the rear end of the tubular shirred formation.

15. Apparatus in accordance with claim 14, wherein the shirring tube is axially movable between an advanced position and a withdrawn position and the stop is engageable with the pull-off collar in the advanced position of the shirring tube.

16. Apparatus in accordance with claim 12, wherein an axial abutment for the front end of the tubular shirred formation is arranged on the gripper device on the opposite side of the storage drum.

17. Apparatus in accordance with claim 13, wherein the pull-off collar is axially longer than the storage drum and the close-off and cutting device together and is to be engaged with the stop at the rear end thereof.

18. Apparatus in accordance with claim 12, wherein two parallel shirring tubes are fixed with the rear ends thereof to a revolver disk and axial movement drives of the revolver disk and, the storage drum are so controlled that during a withdrawal movement of the revolver disk during shirring of tubular casing on one shirring tube the storage drum is movable in the same direction as the revolver disk and moves over the other shirring tube and a tubular shirred formation axially held by the pull-off collar.

19. Apparatus in accordance with claim 12, wherein the gripper device moved in a position axially separated from the shirring tube is located over a slant plane which extends substantially parallel to the shirring tube.

20. Apparatus in accordance with claim 12, wherein the close-off and cutting device comprises two crimping tools for crimping the covering material to the longitudinal axis of the shirring tube, a cutting tool being located between the crimping tools for cutting through the covering material, and closure elements sealing the crimped covering material at both sides of the cut-off point.

21. Apparatus in accordance with claim 20, wherein the cutting tool and the closure elements are in form of one heatable weld head which cuts through the radially crimped covering material by the action of heat and seals off both ends at the cut-off point.

22. Apparatus in accordance with claim 21, wherein the weld head is moved by gravity alone during the welding procedure.

* * * * *